United States Patent
Wu et al.

(10) Patent No.: US 11,068,103 B2
(45) Date of Patent: Jul. 20, 2021

(54) TOUCH SUBSTRATE AND METHOD FOR MANUFACTURING THE SAME, DISPLAY PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Shouzheng Wu, Beijing (CN); Qing Zhang, Beijing (CN); Jun Xu, Beijing (CN); Haozhi Niu, Beijing (CN); Fusheng Huang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 265 days.

(21) Appl. No.: 16/084,597

(22) PCT Filed: Feb. 7, 2018

(86) PCT No.: PCT/CN2018/075581
§ 371 (c)(1),
(2) Date: Sep. 13, 2018

(87) PCT Pub. No.: WO2018/205700
PCT Pub. Date: Nov. 15, 2018

(65) Prior Publication Data
US 2020/0301533 A1    Sep. 24, 2020

(30) Foreign Application Priority Data
May 11, 2017 (CN) .......................... 201710331396.1

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/133512* (2013.01);
(Continued)

(58) Field of Classification Search
CPC .... G02F 1/13338; G02F 1/133; G06F 3/0412; G06F 3/0414; G06F 3/0416;
(Continued)

(56) References Cited

U.S. PATENT DOCUMENTS

2012/0105337 A1* 5/2012 Jun ................... G02F 1/133512
345/173
2016/0377898 A1* 12/2016 Xu .................... G02F 1/133345
349/12
2017/0090636 A1* 3/2017 Ding .................... G06F 3/0412

FOREIGN PATENT DOCUMENTS

CN         101424811 A     5/2009
CN         101576667 A     11/2009
(Continued)

OTHER PUBLICATIONS

Complete english translation of IDS submitted prior art CN101424811 A CN101424811A Touching control panel and touch control type display panel, 2012 (Year: 2012).*
(Continued)

*Primary Examiner* — Nelson M Rosario
(74) *Attorney, Agent, or Firm* — Calfee, Halter & Griswold LLP (57) ABSTRACT

A touch substrate and a method for manufacturing the same, a display panel and a display device. The touch substrate includes a first substrate, and a black matrix and a touch
(Continued)

electrode layer on the first substrate. The black matrix defines an effective display area. An orthographic projection of the effective display area on the first substrate coincides with an orthographic projection of the touch electrode layer on the first substrate.

15 Claims, 5 Drawing Sheets (51) Int. Cl.
G02F 1/1333 (2006.01)
G02F 1/1335 (2006.01)
G06F 3/047 (2006.01)

(52) U.S. Cl.
CPC .. *G02F 1/133514* (2013.01); *G02F 1/133528* (2013.01); *G06F 3/047* (2013.01); *G06F 3/0412* (2013.01); *G06F 3/0445* (2019.05); *G06F 2203/04103* (2013.01)

(58) Field of Classification Search
CPC . G06F 2203/04102; G06F 2203/04103; G06F 3/041
See application file for complete search history.

(56) References Cited

FOREIGN PATENT DOCUMENTS

| CN | 103019496 A | 4/2013 |
|---|---|---|
| CN | 107122078 A | 9/2017 |
| JP | 2015075991 A | 4/2015 |

OTHER PUBLICATIONS

Search Report and Written Opinion for International Application No. PCT/CN2018/075581 dated May 9, 2018.
First Office Action for Chinese Patent Application No. 201710331396.1 dated Jun. 25, 2018.
Second Office Action for Chinese Patent Application No. 201710331396.1 dated Jan. 8, 2019.

* cited by examiner

TOUCH SUBSTRATE AND METHOD FOR MANUFACTURING THE SAME, DISPLAY PANEL AND DISPLAY DEVICE

CROSS REFERENCE TO RELATED APPLICATIONS

The present application is a 35 U.S.C. § 371 national stage application of PCT International Application No. PCT/CN2018/075581, filed on Feb. 7, 2018, which claims the priority of Chinese patent application No. 201710331396.1, filed on May 11, 2017, the content of which are incorporated herein by reference in their entireties.

TECHNICAL FIELD

The present application relates to the field of display technologies, and in particular, to a touch substrate and a method for manufacturing the same, a display panel, and a display device.

BACKGROUND

Force touch is a touch sensing technology. With force touch, the device can sense the amount of pressure and call up the corresponding function. Known products with force touch function usually attach a force touch flexible circuit board (FPC) to the back of the backlight unit (BLU), i.e., the electrode structure for implementing the force touch function is located outside the box. This leads to low product integration.

SUMMARY

According to an exemplary embodiment of the present disclosure, there is provided a touch substrate including a first substrate, and a black matrix and a touch electrode layer on the first substrate. The black matrix defines an effective display area. An orthographic projection of the effective display area on the first substrate coincides with an orthographic projection of the touch electrode layer on the first substrate.

In some embodiments, the touch electrode layer includes a plurality of touch electrodes that are insulated from each other.

In some embodiments, the touch substrate further includes a wiring connected between the touch electrode and an integrated circuit.

In some embodiments, the wiring includes two portions. A first portion of the wiring is on the black matrix. A second portion of the wiring is at a side surface of the black matrix and connected between the first portion of the wiring and the touch electrode.

In some embodiments, a material of the touch electrodes is transparent indium tin oxide.

In some embodiments, the touch substrate further includes color filters on the touch electrodes.

According to another exemplary embodiment of the present disclosure, there is provided a display panel, including the touch substrate according to any of the embodiments above.

In some embodiments, the touch substrate is a color film substrate.

In some embodiments, the display panel further includes an array substrate disposed opposite to the touch substrate.

In some embodiments, the array substrate includes a second substrate and a reference layer at a side of the second substrate away from the touch substrate. The reference layer is configured to form a capacitance with the touch electrode layer.

In some embodiments, the reference layer is a composite polarizer plated with an electrode layer.

According to yet another exemplary embodiment of the present disclosure, there is provided a display device including the display panel according to any one of the above embodiments.

In some embodiments, the display device further includes an integrated circuit configured to control enablement of the reference layer.

In some embodiments, the integrated circuit is further configured to control an amount of interconnection of the touch electrodes of the touch electrode layer to adjust touch sensitivity.

According to still another exemplary embodiment of the present disclosure, there is provided a method for manufacturing a touch substrate including the steps of providing a black matrix on a first substrate, wherein the black matrix defines an effective display area; and forming a touch electrode layer on the first substrate which has been provided with the black matrix, wherein an orthographic projection of the touch electrode layer on the first substrate coincides with an orthographic projection of the effective display area on the first substrate.

In some embodiments, the black matrix and the touch electrode layer are manufactured by using one mask plate.

In some embodiments, the step of providing the black matrix on the first substrate includes coating a first photoresist on the first substrate, exposing by using a black matrix mask, and rinsing the first photoresist by using a developer to obtain the black matrix.

In some embodiments, the step of forming the touch electrode layer on the first substrate which has been provided with the black matrix includes sputtering a complete touch electrode layer on a surface of the first substrate which has been provided with the black matrix; coating a second photoresist on the complete touch electrode layer; exposing by using the black matrix mask; rinsing the second photoresist by using a developer to define an exposed touch electrode layer on the complete touch electrode layer; etching away the exposed touch electrode layer by using an etchant to obtain touch electrodes, the orthographic projection of the touch electrodes on the first substrate coincides with the orthographic projection of the effective display area on the first substrate; and removing the second photoresist on the touch electrode layer.

In some embodiments, an optical property of the first photoresist is opposite to an optical property of the second photoresist.

In some embodiments, the method further includes providing a wiring connected between the touch electrode layer and an integrated circuit.

The method for manufacturing a touch substrate according to an exemplary embodiment of the present disclosure produce a force touch electrode layer by performing reverse exposure using a black matrix mask, so that there is no need to make a new mask, thereby reducing the manufacturing cost.

It should be understood that, the terms "first," "second," and similar terms in the description and the claims are used to distinguish similar elements and are not necessarily used to describe a sequence or chronological order. It will also be understood that the terms so used are interchangeable where appropriate. Moreover, the described embodiments of the present disclosure can operate in an order other than the described order.

BRIEF DESCRIPTION OF DRAWINGS

These and other exemplary embodiments of the disclosure are apparent from and will be further elucidated, by way of example, with reference to the drawings, in which.

DETAILED DESCRIPTION

The present disclosure provides a touch substrate and a method for manufacturing the same, a display panel and a display device, which integrates a touch electrode layer on a touch substrate, and ensures that the displayed image is not affected, thereby improving the degree of integration of the product, simplifying the manufacturing method, saving manufacturing costs and increasing manufacturing efficiency.

According to an exemplary embodiment of the present disclosure, there is provided a touch substrate. The touch substrate can be a color film substrate. The touch substrate includes a first substrate, and a black matrix and a touch electrode layer on the first substrate. The black matrix defines an effective display area. The orthographic projection of the effective display area on the first substrate coincides with the orthographic projection of the touch electrode layer on the first substrate. In other words, the orthographic projection of the touch electrode layer on the first substrate is complementary to the orthographic projection of the black matrix on the first substrate. The two projections do not coincide with each other and together cover the entire surface of the first substrate. The touch electrode layer can be used to detect pressure for enforcing the force touch function. In that situation, the touch electrode layer can also be called a force touch-sensing layer. In addition, the touch electrode layer can also be used to detect the location of touching.

The orthographic projections of the effective display area defined by the black matrix and the touch electrode layer on the first substrate coincide with each other. This arrangement may ensure that the stack structure of the effective display area would not be damaged to induce a picture defect. If the stacked structures of the effective display areas are inconsistent, their transmittances will be different, so that the brightness of each effective display area is uneven when viewed by the human eye. Only when the stacked structures of the effective display areas are ensured to be consistent, the brightness of the light perceived by the human eye passing through the effective display area is the same, and the phenomenon of uneven brightness would not occur.

In an embodiment, the touch electrode layer includes a plurality of touch electrodes that are insulated from each other. The shapes of these touch electrodes can be block or strip. The present application does not limit the specific shape of the touch electrode. These touch electrodes form a touch-sensing layer and are complementary to the position of the black matrix. That is, on the first substrate, the black matrix is opaque, while the remaining areas are transmissive, and these transmissive areas are covered by the touch-sensing layer.

In an embodiment, the touch substrate further includes a wiring connected between the touch electrode and the integrated circuit.

In an embodiment, the wiring may be a metal wiring or a wiring of other materials. The wiring is arranged to electrically connect each touch electrode on the touch electrode layer to the integrated circuit.

In an embodiment, the wiring includes two portions. The first portion of the wiring is on the black matrix, and the second portion of the wiring is on a side surface of the black matrix and connected between the first portion of the wiring and the touch electrode.

The touch substrate according to the present disclosure arranges the wiring with the shielding effect of the black matrix, thereby ensuring that the displayed picture is not affected by the wiring, and the conventional problem of poor optical performance would not appear.

In an embodiment, the material of the touch electrode is transparent indium tin oxide (ITO). Apparently, the material of the touch electrode is not limited to ITO. It can also use other materials.

In an embodiment, the touch substrate according to the present disclosure further includes a color filter located above the touch electrode. The color filter includes, for example, Red, Green, and Blue filter. Of course, the color filters can also be filters of other colors.

The color film substrate will be taken as an example to describe the method for manufacturing the touch substrate of the present disclosure and the resulting structure.

Figure 1:
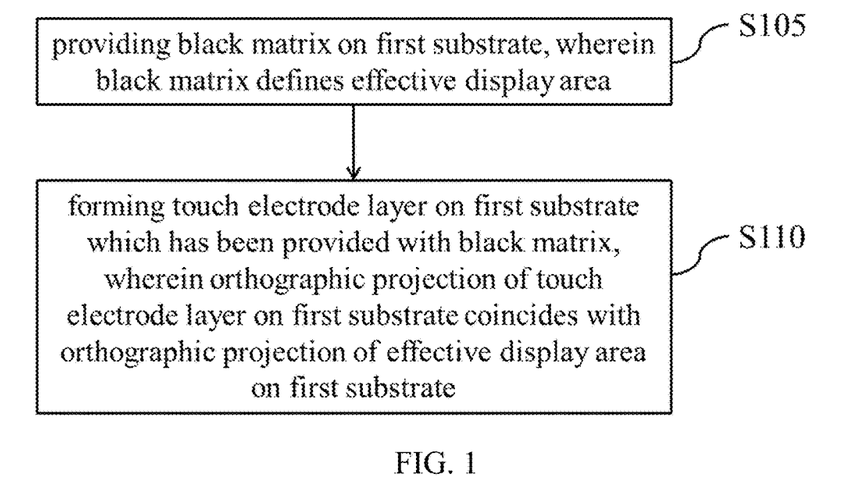
FIG. 1 schematically illustrates steps of a method for manufacturing a touch substrate in accordance with the present disclosure.

FIG. 1 schematically illustrates steps of a method for manufacturing a touch substrate according to the present disclosure, including the step S105, which is providing a black matrix on a first substrate, wherein the black matrix defines an effective display area; and the step S110, which is forming a touch electrode layer on the first substrate which has been provided with the black matrix, wherein an orthographic projection of the touch electrode layer on the first substrate coincides with an orthographic projection of the effective display area on the first substrate.

Figure 2:
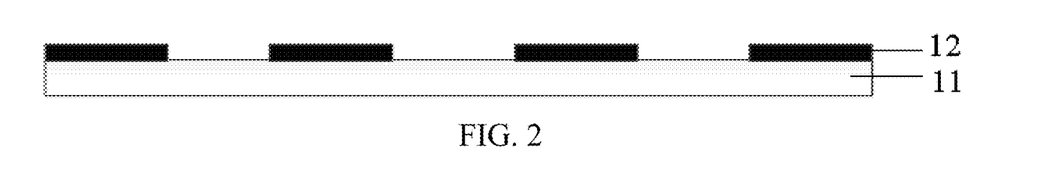
FIG. 2 schematically depicts a first substrate having a black matrix in accordance with the present disclosure.

FIG. 2 schematically depicts a first substrate 11 which comprises a black matrix 12. The first substrate 11 may be a glass substrate. The function of the black matrix in the touch substrate of the present disclosure, which is substantially the same as a conventional black matrix, is to partitioning during normal display of images to prevent crosstalk and increase contrast.

Figure 3A:
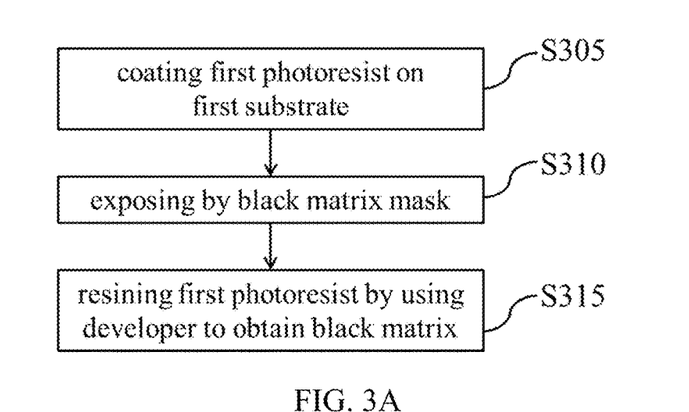
FIG. 3A schematically illustrates steps of a method of making a black matrix in accordance with the present disclosure.

FIG. 3A schematically illustrates steps of the method of manufacturing a black matrix according to the present disclosure, including step S305, which is coating a first photoresist on the first substrate. The photoresist commonly used to make black matrix is negative photoresist. The negative photoresist, also known as photo-etching agent, is a mixed liquid, which is light-sensitive, composed of three main components: photosensitive resin, sensitizer and solvent. The solubility of negative photoresist in developer increases when illuminated by specific light. The method can also include step S310, which is exposing by a black matrix mask. The exposure causes the first photoresist at the location where is going to become the effective display area to react and become soluble in the developer. The method can also include the step S315, which is resining the first photoresist by using the developer to obtain the black matrix. This process causes the first photoresist to be dissolved in the developer to be removed, resulting in separate effective display areas 31. It should be understood that the wording "resining" refers to any action that removes the photoresist dissolved in the developer from the substrate, including, in particular, soaking.

Figure 3B:
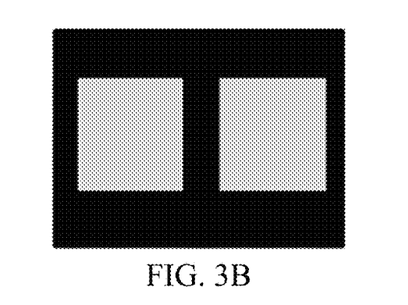
FIG. 3B schematically depicts a black matrix mask in accordance with the present disclosure.
Figure 3C:
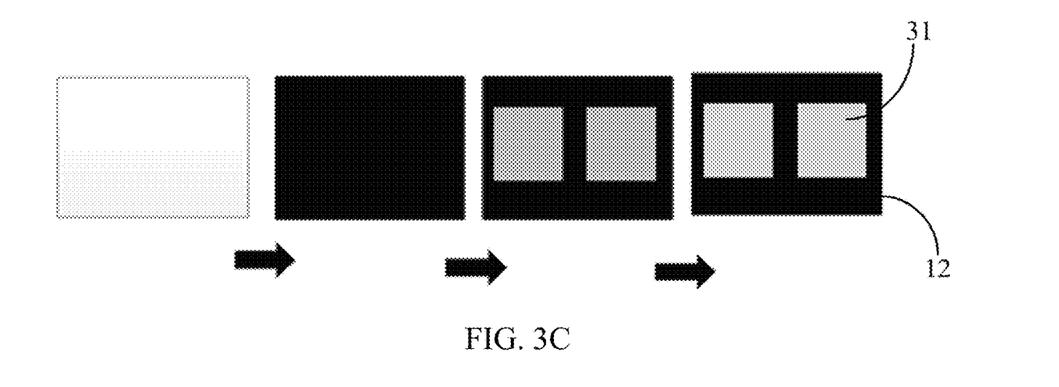
FIG. 3C schematically depicts a variation of the touch substrate in the process of making a black matrix on a first substrate in accordance with the present disclosure.

Specifically, FIG. 3B schematically illustrates a mask for making the black matrix 12. FIG. 3C schematically illustrates the changes of the structure of the touch substrate in the process of making the black matrix 12 on the first substrate by using the mask of FIG. 3B. FIG. 3C illustrates four drawings showing changes of the structure of the substrate. The first drawing shows an unprocessed substrate. The second drawing shows the substrate coated with the first photoresist. The third drawing shows the first photoresist after being exposed. The fourth drawing shows the black matrix formed by the first photoresist after development. It should be noted that the third drawing is only used to schematically distinguish between the exposed areas and the non-exposed areas in the first photoresist. The third drawing does not indicate that the shape of the structure of the first photoresist may change after the exposing operation.

Figure 4:
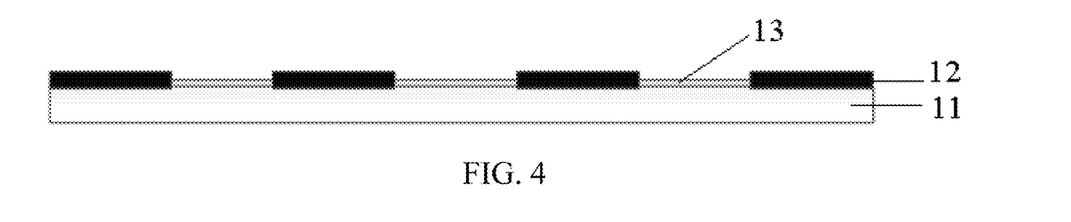
FIG. 4 schematically depicts a first substrate having a black matrix and an ITO electrode in accordance with the present disclosure.

FIG. 4 schematically illustrates a first substrate 11 comprising the black matrix 12 and the ITO electrode 13 constituting a force touch-sensing layer. The ITO electrode 13 is located in the effective display area defined by the black matrix 12, and the orthographic projection of the ITO electrode 13 on the first substrate 11 coincides with the orthographic projection of the effective display area, that is, the projections of the ITO electrode 13 and the black matrix 12 are complementary.

Figure 5A:
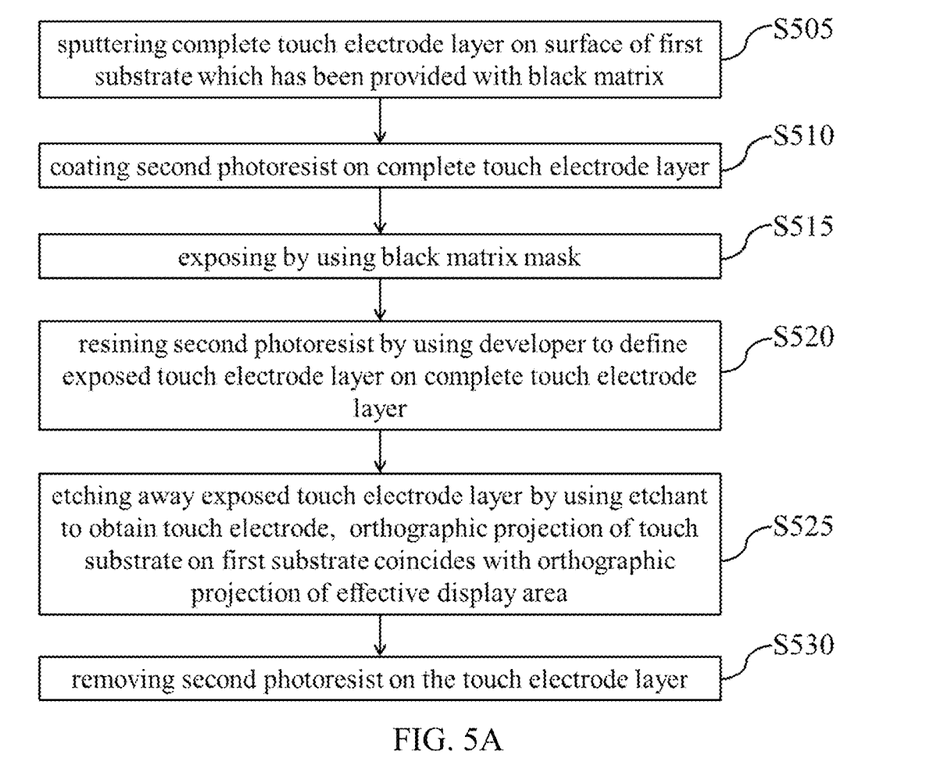
FIG. 5A schematically illustrates steps of a method for making an ITO electrode in accordance with the present disclosure.
Figure 5B:
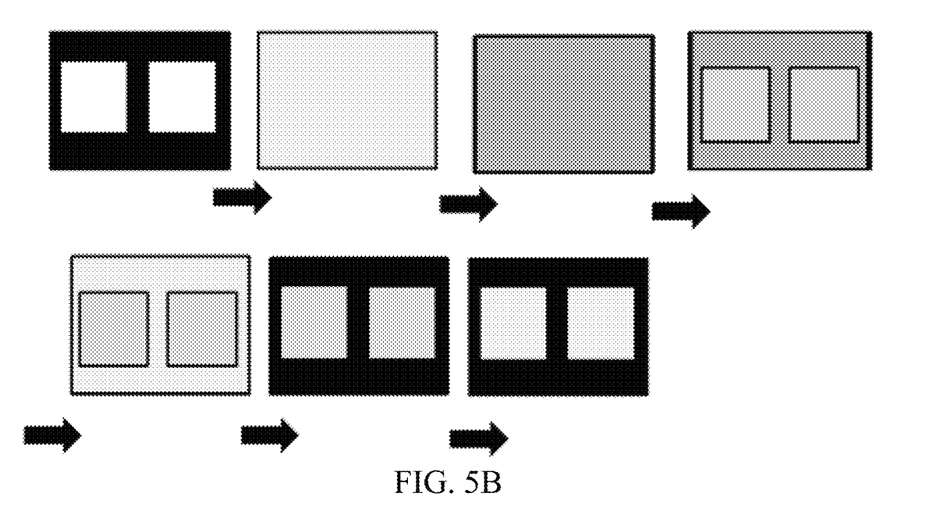
FIG. 5B schematically depicts a variation of the touch substrate in the process of making an ITO electrode in accordance with the present disclosure.

Specifically, FIG. 5A schematically illustrate the steps of the method for making the ITO electrode 13. FIG. 5B schematically shows changes in the touch substrate in the procedure of making the ITO electrode 13. FIG. 5B shows seven drawings showing changes in the structure of the substrate. The first drawing shows a substrate having a black matrix. The second drawing shows a substrate sputtered with a complete touch electrode layer. The third drawing shows the touch electrode layer after coated with the second photoresist. The fourth drawing shows the second photoresist which has been exposed. The fifth drawing shows the touch electrode layer partially covered with the second photoresist after development. The sixth drawing shows the touch electrode layer having been etched. The seventh drawing shows the touch electrode layer after the second photoresist is removed. It should be noted that the fourth drawing is only used to schematically distinguish between the exposed areas and the non-exposed areas in the second photoresist. The fourth drawing does not indicate that the shape of the structure of the second photoresist may change after the exposing operation.

The method for making the ITO electrode 13 includes steps S505, S510, S515, S520, S525, and S530. Step S505 is sputtering a complete touch electrode layer on the surface of the first substrate which has been provided with the black matrix. The sputtered material can be ITO. This step is also referred to as sputtering coating, which is used for forming an ITO film on a substrate.

Step S510 is coating a second photoresist on the complete touch electrode layer. The optical property of second photoresist used in this step is opposite to the optical property of the first photoresist used for making the black matrix. The photoresist commonly used to make the black matrix is negative photoresist, and positive photoresist is used when making the ITO electrode. The positive photoresist is also called positive-photoresist. The positive photoresist resin is phenolic formaldehyde called novolac. It provides the adhesion and chemical resistance of the photoresist. When no dissolution inhibitor is present, the novolac will dissolve in the developer. Diazonaphthoquinone (DNQ) is a strong dissolution inhibitor that reduces the rate of dissolution of the resin. After UV exposure, DNQ is chemically decomposes in the photoresist. Its ability to inhibit dissolution is weakened so that the solubility is increased, so that the solubility factor in the developer is greatly increased to 100 or higher. This exposure reaction may produce carboxylic acid in DNQ, which is highly soluble in developer. Positive photoresist has good contrast, so the generated image has good resolution;

Step S515 is exposing by using the black matrix mask. In this procedure, the second photoresist of the effective display area undergoes a condensation reaction;

Step S520 is resining the second photoresist by using a developer to define an exposed touch electrode layer on the complete touch electrode layer. Since the negative photoresist undergoes a condensation reaction during the exposure and is insoluble in developer, a photoresist covers the ITO electrode corresponding to the effective display area;

Step S525 is etching away the exposed touch electrode layer by using an etchant to obtain a touch electrode (ITO electrode) protected by the second photoresist. The orthographic projection of the touch substrate on the first substrate coincides with the orthographic projection of the effective display area; and Step S530 is removing the second photoresist on the touch electrode layer. The ITO electrode is therefore exposed.

It can be understood that the embodiments of the present application can accomplish the manufacturing of the ITO electrode without making a new mask.

Figure 6:
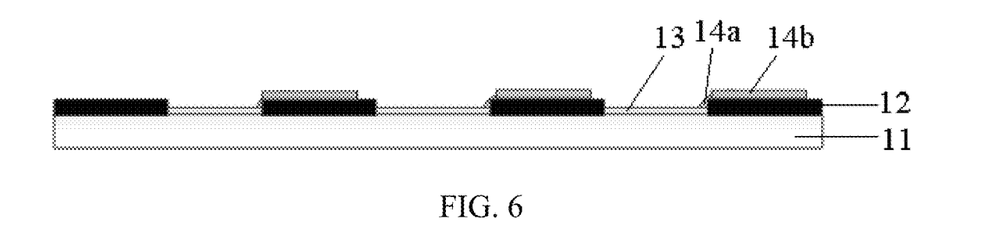
FIG. 6 schematically depicts a first substrate having a black matrix, an ITO electrode, and a metal wiring in accordance with the present disclosure.

FIG. 6 schematically depicts the first substrate having the black matrix, the ITO electrode and the metal wiring in accordance with the present disclosure. Considering the requirements of shading and touching accuracy of the black matrix, the wiring can be made directly by Al/Cu/Ag material whose electrical conductivity is good. The wiring is directly placed on the black matrix and placed at a side surface of the black matrix. In other words, the wiring includes two portions, the first portion 14b of the wiring is located on the black matrix 12, and the second portion 14a of the wiring is located on a side surface of the black matrix 12 and connected between the first portion 14b of the wiring and the ITO electrode 13. As shown in FIG. 6, a wiring exist on the black matrix 12 and at the corner of the black matrix 12 and the ITO electrode 13. The second portion 14a of the wiring at the corner is used to connect the ITO electrode 13 to the first portion 14b of the wiring on the black matrix 12.

Figure 7:
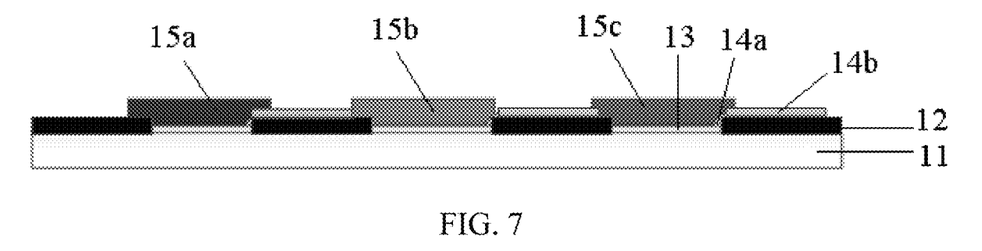
FIG. 7 schematically depicts a first substrate having a black matrix, an ITO electrode, a metal wiring, and a color filter in accordance with the present disclosure.

FIG. 7 schematically depicts the first substrate having the black matrix, the ITO electrode, the metal wiring and the color filter in accordance with the present disclosure. The color filter includes a Red filter 15a, a Green filter 15b, and a Blue filter 15c, respectively.

Figure 8:
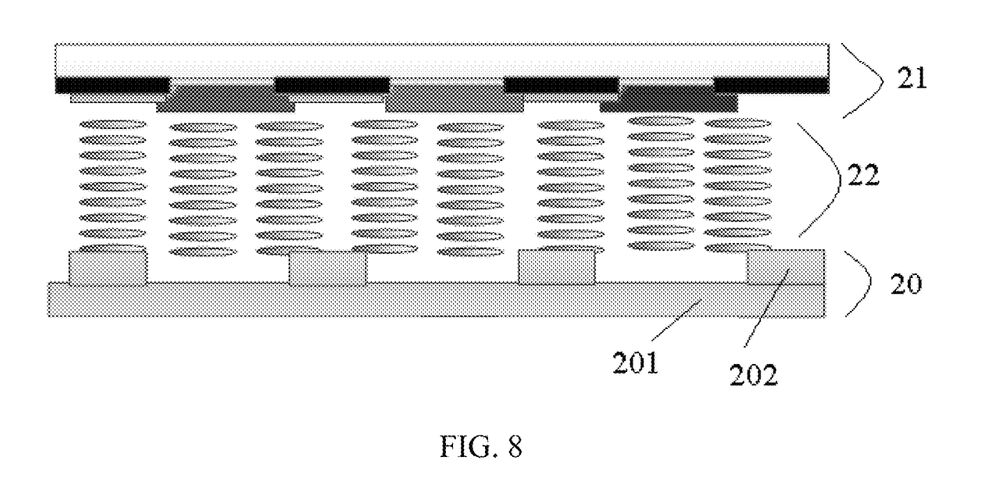
FIG. 8 schematically depicts a touch substrate and an array substrate after assembling in accordance with the present disclosure.

FIG. 8 schematically depicts the touch substrate (color film substrate 21) and the array substrate 20 after assembled (by using the cell assembling method) according to the present disclosure. The structure and manufacturing method of the array substrate 20 are identical to the common methods. A liquid crystal layer 22 is present between the color film substrate 21 and the array substrate 20. The array substrate 20 includes a second substrate 201 and a TFT device 202 on the second substrate 201. The second substrate 201 may be a glass substrate.

Figure 9:
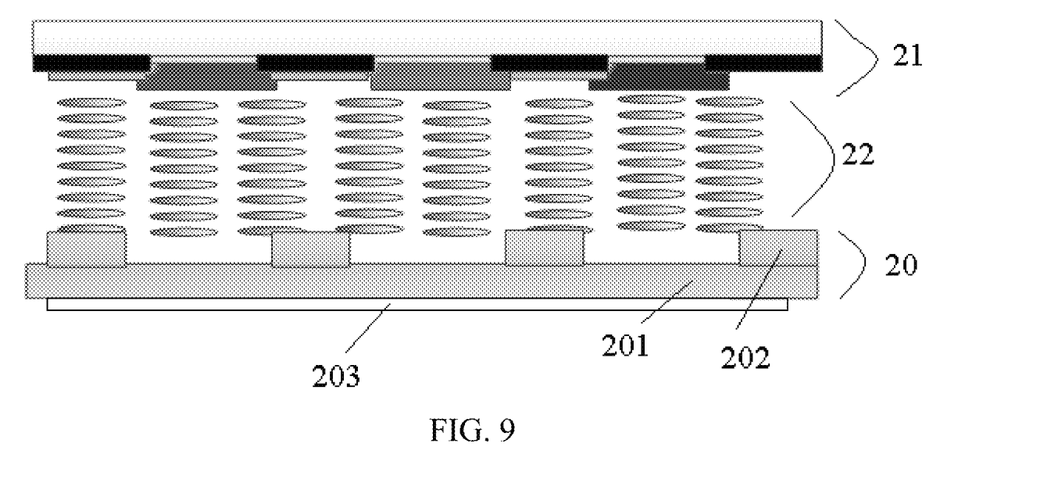
FIG. 9 schematically depicts an array substrate fabricated with a reference layer in accordance with the present disclosure.

FIG. 9 schematically depicts an array substrate having a reference layer in accordance with the present disclosure. A composite polarizer 203 is attached to a side of the array substrate away from the color film substrate 21. The composite polarizer 203 is the same as the composite polarizer used in the current conventional force touch. The composite polarizer 203 is a polarizer, the entire surface of which is plated with an ITO film (electrode). It can be used as a reference layer for a force touch.

In summary, an exemplary embodiment of the present disclosure provides a method for manufacturing a touch substrate, including the following steps: Step S105, providing a black matrix on a first substrate, wherein the black matrix defines an effective display area; and Step S110, forming a touch electrode layer on the first substrate which has been provided with the black matrix, and an orthographic projection of the touch electrode layer on the first substrate coincides with an orthographic projection of the effective display area on the first substrate.

In an exemplary embodiment, the step S105 specifically includes:

S305: coating a first photoresist on the first substrate;
S310: exposing by using a black matrix mask; and
S315: resining the first photoresist by using a developer to obtain the black matrix.

In an exemplary embodiment, step S110 specifically includes:

S505: sputtering a complete touch electrode layer on a surface of the first substrate which has been provided with the black matrix;
S510: coating a second photoresist on the complete touch electrode layer;
S515: exposing by using a black matrix mask;
S520: resining the second photoresist by using a developer to define an exposed touch electrode layer on the complete touch electrode layer;
S525: etching away the exposed touch electrode layer by using an etchant to obtain a touch electrode, and the orthographic projection of the touch electrode on the first substrate coincides with the orthographic projection of the effective display area on the first substrate; and
S530: removing the second photoresist on the touch electrode layer.

The method for manufacturing a touch substrate according to an exemplary embodiment of the present disclosure utilizes a black matrix mask for reverse exposure to create a force touch electrode layer without using a new mask. This reduces the cost of manufacturing.

In an embodiment, the method for manufacturing a touch substrate further comprises: providing a wiring connected between the touch electrode layer and the integrated circuit. In a specific embodiment, the wiring comprises two portions, a first portion of the wiring is on the black matrix, and a second portion of the wiring is at a side surface of the black matrix and connected between the first portion of the wiring and the touch electrode.

The technical solution provided by the present disclosure uses the black matrix mask to form a touch electrode layer on the first substrate which has been provided with a black matrix. The touch electrode layer is located at the effective display area defined by the black matrix. The orthographic projection of touch electrode layer on the first substrate coincides with the orthographic projection of the black matrix. This can ensure that the stacked structure of the effective display area would not be destroyed and causing the poor quality image. The stacked structures of the various effective display areas of the present disclosure are identical. This ensures that the brightness of the light perceived by the human eye passing through the effective display areas is the same, and the phenomenon of uneven brightness will not occur.

In addition, it should be noted that the touch substrate provided by the present disclosure is not limited to a liquid crystal display panel. It can also be used in OLED display panels.

According to yet another exemplary embodiment of the present disclosure, there is provided a display panel, comprising the touch substrate according to an exemplary embodiment of the present disclosure.

In an embodiment, the touch substrate is a color film substrate.

In an embodiment, the display panel further comprises an array substrate disposed opposite to the touch substrate (color film substrate).

In an embodiment, the array substrate comprises a second substrate, and a reference layer located at a side of the second substrate away from the touch substrate (color film substrate), which is used for forming capacitance with the touch electrode layer.

In the embodiments of the present application, the force touch function is more sensitive because the distance between the touch electrode layer and the reference layer is closer.

In an embodiment, the reference layer is a composite polarizer plated with an electrode layer.

In accordance with still another exemplary embodiment of the present disclosure, there is provided a display device comprising a display panel in accordance with the present disclosure.

In an embodiment, the display device further comprises an integrated circuit for controlling the enablement of the reference layer and thus controlling whether the touch recognition process is performed according to the capacitance between the touch electrode layer and the reference layer. That is to say, in the embodiments of the present application, the integrated circuit can suspend the reference layer (i.e., deactivating the reference layer) by stop outputting the signal to the reference layer, so that there is no need to consider the reference layer during the touch recognition process. In another embodiment, it is also possible to ignore the signal of the reference layer during the touch recognition processing, that is, the reference layer is not used as a reference for touch recognition, when the signal is output to the reference layer. That is to say, the embodiments of the present application control the enablement of the reference layer by using an integrated circuit. The wording "deactivating" means suspending the electrode of the reference layer to disconnected to the ground (GND) and/or the power supply voltage (VDD). In this way, the force touch structure becomes an In-Cell touch. When deactivated, it can be seen as a simple Sloc (On-Cell) touch product performing the ordinary touch function. If the force touch function needs to be turned on, what is needed is to add the reference layer data. The reference layer data means the differences of the capacitance values of all ITO electrodes relative to the reference layer. It is used to determine whether there is a pressing action on the unified bases of the reference layer.

In an embodiment, the integrated circuit is further used to adjust the sensitivity of the force touch by controlling the number of interconnections of the touch electrode on the touch electrode layer. For example, multiple touch electrodes can be used as a single touch electrode for force touch recognition by a preset algorithm. Force touch recognition can also be conducted for each touch electrode. That is, the integrated circuit can adjust the sensitivity of the entire force touch by adjusting the number of interconnected ITO electrodes of the color film substrate. In the most sensitive situation, the sensitivity can be adjusted to a single pixel. When the sensitivity is not required to be such high, the metal wires corresponding to the multiple ITO electrodes can be connected together, that is, the ITO electrodes of a certain portion of a region are connected together to be used as the force touch-sensing layer as a whole. In addition, multiple touch electrodes can be interconnected physically in advance to meet the sensitivity required by the product, without the sensitivity controls achieved by integrated circuit by an algorithm.

In summary, when a finger touches/presses the display panel provided by the present disclosure, the first deformed element is the color film substrate, which then causes the intermediate liquid crystal (LC) layer to be deformed, and finally causes the array substrate to be deformed. This structure will sense every change. The sensitivity is stronger than the previous single force touch function, and subtle pressure changes can be detected. Moreover, the display device according to the present disclosure can synchronously implement the traditional touch function and the force touch function. This cannot be achieved by a common force touch device.

The display device provided by the present disclosure can be used for products with touch functions, such as a television, a mobile phone, a tablet, a computer, and the like.

In summary, the present application discloses a touch substrate and a method for manufacturing the same, a display panel and a display device, which integrate a touch electrode layer on a touch substrate, and ensure that the displayed image is not affected, thereby improving the degree of integration of the product. The touch substrate includes a first substrate and a black matrix on the first substrate. The black matrix defines an effective display area. The touch substrate further comprises a touch electrode layer. The orthographic projection of the effective display area on the first substrate coincides with the orthographic projection of the touch electrode layer on the first substrate.

In the touch substrate of the present disclosure, the black matrix and the ITO electrode are made by using the same mask and two exposure processes adapting respectively the positive and negative photoresists, which saves the mask and therefore reduces the manufacturing cost. Moreover, by directly provide the ITO electrode at the effective display area, some optical problems can be avoided. The optical problems mean that the effective display areas cause difference in transmittance due to the inconsistent stacked structure, so that a problem of uneven brightness may occurs in the lighting state. By placing the ITO electrode directly in the area where the RGB pixel is located, the present application ensures that the stacks of the entire effective display area are consist, so that the optical paths of the pixels are the same, so that the problem of the image of uneven brightness would not be generated. The stacked structures of each of effective display areas are completely the same, so there is no defect in optical quality. The touch substrate of the present disclosure can also switch between force touch and traditional touch through an integrated circuit, and can further adjust the force touch sensitivity, so that the force touch sensitivity is more appropriate and the experience is better.

It can be understood that the above embodiments are merely exemplary embodiments employed to explain the principles of the present disclosure. The present disclosure is not limited thereto. Obviously, those skilled in the art can make various modifications and variations to the present application without departing from the spirit and scope of the application. Thus, if these modifications and variations of the present application are in the scope of the claims of the present application or their equivalent techniques, the present application will intent to cover these modifications and variations.

We claim:

1. A touch substrate comprising:
a first substrate, and
a black matrix and a touch electrode layer on the first substrate,
wherein the black matrix defines an effective display area, and an orthographic projection of the effective display area on the first substrate coincides with an orthographic projection of the touch electrode layer on the first substrate,
wherein the touch electrode layer comprises a plurality of touch electrodes that are insulated from each other, and
wherein the touch substrate further comprising a wiring connected between one of the plurality of touch electrodes and an integrated circuit, the wiring comprises two portions, wherein a first portion of the wiring is on the black matrix, and a second portion of the wiring is at a side surface of the black matrix and connected between the first portion of the wiring and the one of the plurality of touch electrodes.

2. The touch substrate of claim 1, wherein a material of the plurality of touch electrodes is transparent indium tin oxide.

3. The touch substrate of claim 1 further comprising a plurality of color filters each of which is on a respective one of the plurality of touch electrodes.

4. A display panel comprising the touch substrate according to claim 1.

5. The display panel of claim 4, wherein the touch substrate is a color film substrate.

6. The display panel of claim 5, further comprising an array substrate disposed opposite to the touch substrate.

7. The display panel of claim 6, wherein the array substrate comprises a second substrate and a reference layer at a side of the second substrate away from the touch substrate, wherein the reference layer is configured to form a capacitance with the touch electrode layer.

8. The display panel of claim 7, wherein the reference layer is a composite polarizer plated with an electrode layer.

9. A display device comprising the display panel according to claim 7.

10. The display device of claim 9, further comprising an integrated circuit configured to control enablement of the reference layer.

11. The display device of claim 10, wherein the integrated circuit is further configured to control an amount of interconnection of the plurality of touch electrodes of the touch electrode layer to adjust touch sensitivity.

12. A method for manufacturing a touch substrate comprising steps of:
coating a first photoresist on a first substrate,
exposing the first photoresist by using a black matrix mask, and
rinsing the first photoresist by using a first developer to obtain a black matrix, wherein the black matrix defines an effective display area;
sputtering a complete touch electrode layer on a surface of the first substrate which has been provided with the black matrix;
coating a second photoresist on the complete touch electrode layer;
exposing the second photoresist by using the black matrix mask;
rinsing the second photoresist by using a second developer to define an exposed touch electrode layer on the complete touch electrode layer;
etching away the exposed touch electrode layer by using an etchant to obtain touch electrodes, wherein an orthographic projection of the touch electrodes on the first substrate coincides with an orthographic projection of the effective display area on the first substrate,
removing the second photoresist on the touch electrode layer.

13. The method of claim 12, wherein the black matrix and the touch electrode layer are manufactured by using one mask plate.

14. The method of claim 12, wherein an optical property of the first photoresist is opposite to an optical property of the second photoresist.

15. The method of claim 12 further comprising:
providing a wiring connected between the touch electrode layer and an integrated circuit.

* * * * *